United States Statutory Invention Registration [19]

[11] Reg. Number: H389

Moon

[43] Published: Dec. 1, 1987

[54] FLUID REFRACTION OPTICAL PATH PHASE CORRECTION

[75] Inventor: Lamar F. Moon, Agoura, Calif.

[73] Assignee: The United States of America as represented by the Secretary of the Air Force, Washington, D.C.

[21] Appl. No.: 816,610

[22] Filed: Jan. 6, 1986

[51] Int. Cl.[4] ..... H01S 3/22; H01S 3/095

[52] U.S. Cl. ..... 372/58; 372/33; 372/89

[56] References Cited

U.S. PATENT DOCUMENTS

| | | | |
|---|---|---|---|
| 3,842,363 | 10/1974 | Dobrzelecki | 331/94.5 G |
| 3,986,138 | 10/1976 | Neal | 331/94.5 P |
| 4,095,193 | 6/1978 | Clark | 331/94.5 G |

*Primary Examiner*—Stephen C. Buczinski
*Assistant Examiner*—Linda J. Wallace
*Attorney, Agent, or Firm*—Gerald B. Hollins; Donald J. Singer

[57] ABSTRACT

An optical path length changing arrangement employing a selected cross-section of pressurized gases or other fluid and usable in a space weapon chemical laser and in other optical equipment for phase changes along a transmitted wavefront. Use of a heavy, high-refraction index gas such as Freon® or nitrogen as the optical path length correcting medium is disclosed, along with adjacent buffering streams of a light, low optical refraction gas such as helium.

43 Claims, 8 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

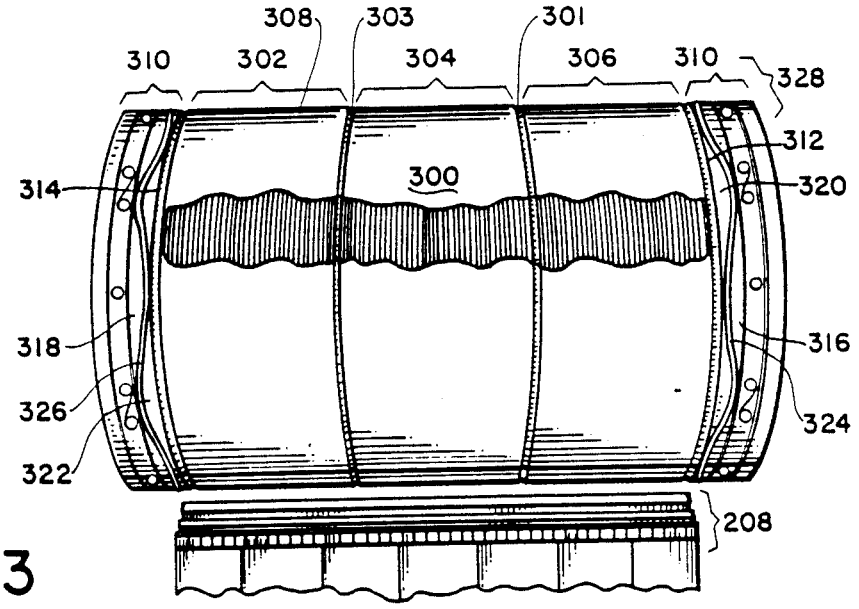
Fig. 3
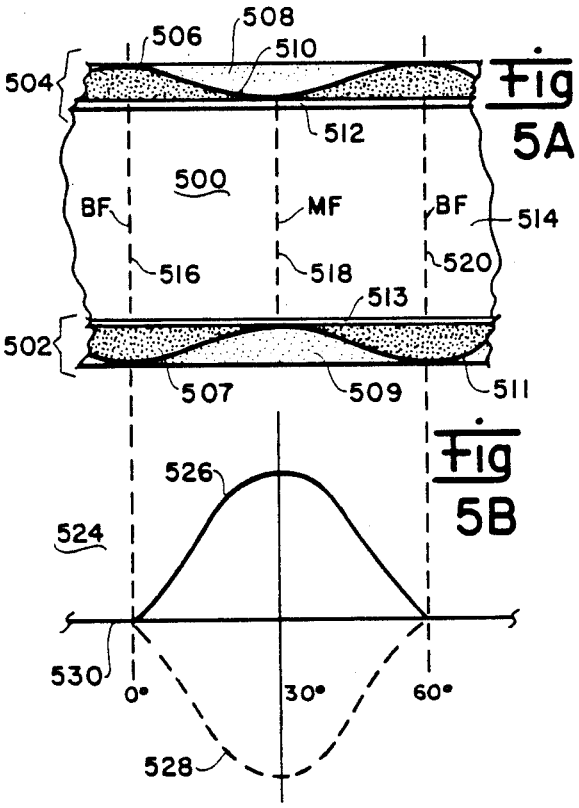
Fig 5A
Fig 5B
Fig. 5
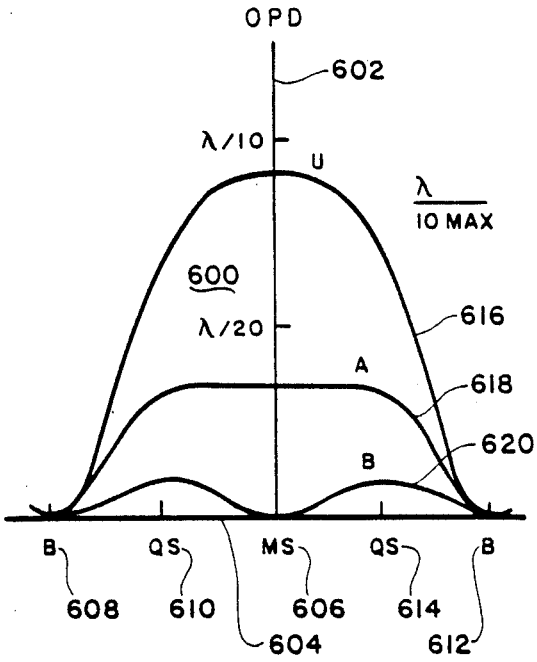
Fig. 6

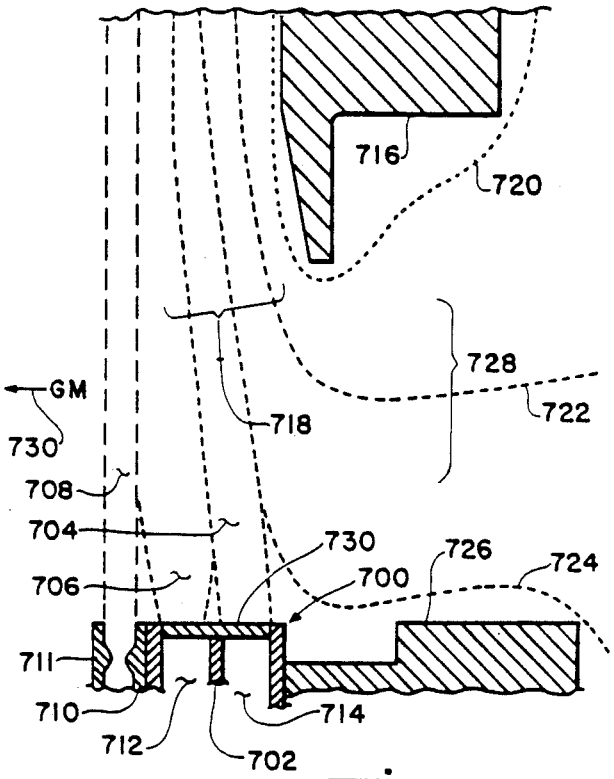
Fig. 7
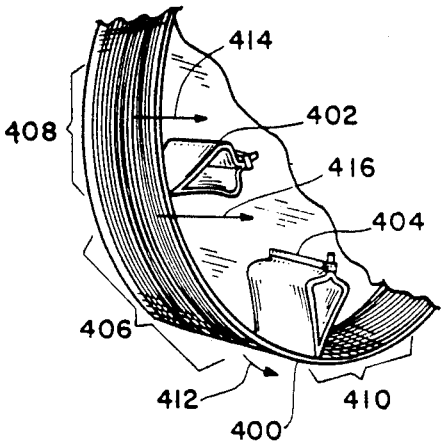
Fig. 4
Fig 8
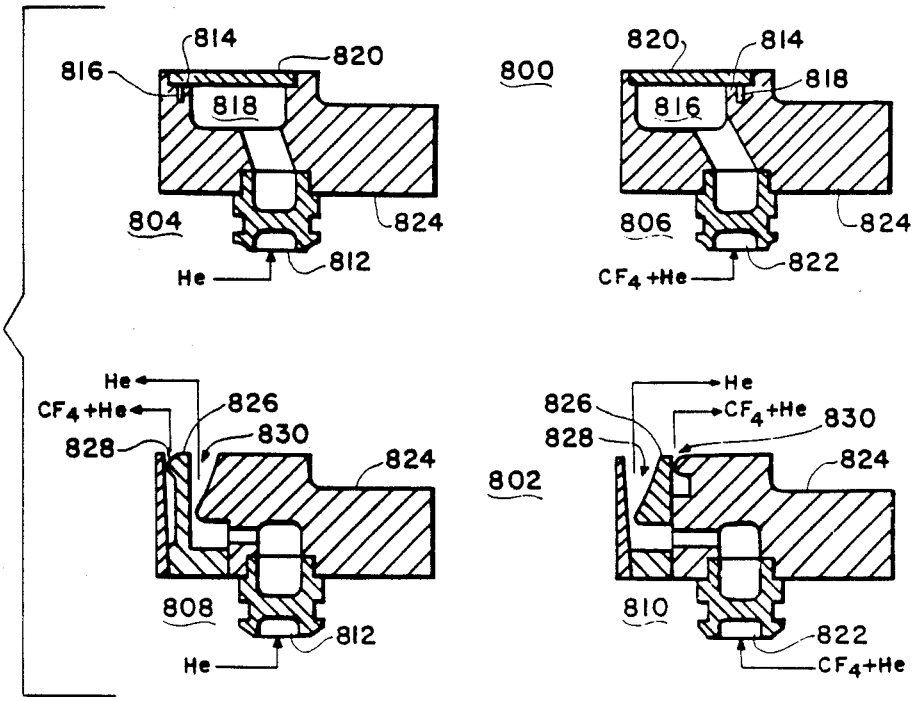

FLUID REFRACTION OPTICAL PATH PHASE CORRECTION

RIGHTS OF THE GOVERNMENT

The invention described herein may be manufactured and used by or for the Government of the United States for all governmental purposes without the payment of any royalty.

BACKGROUND OF THE INVENTION

This invention relates to the field of optical energy beam signal phase correction by a controllable selective refraction.

It is desirable to alter phase relationships across the spatial extent of an optical energy beam for the lasers contemplated in space weapons as part of the strategic defense initiative (SDI) program, for scientific laser applications, and in many optical energy transfer and signal processing applications. A need for phase alteration can arise from a need to reshape such an energy beam, a need to assure effective mode selection in a laser device, or the need to pack the laser beam and deliver a maximum amount of optical energy to a small, far field location as would be desired in a laser weapon device.

For laser weapons the use of chemical lasers, that is, lasers achieving stimulated emission with the energy derived from chemical reactants and produce optical energy in the infrared or far-infrared spectral region are most practical. In such lasers a gain generating apparatus, possibly in the form of a cylindrical body is placed within an optical resonance cavity that includes a pair of reflective devices. The gain generator in such a cylindrical chemical laser provides an annular shaped elongated field of high temperature gain media which is optically aligned with the reflective devices of the resonant cavity to comprise the functional laser. Lasers of this type have the notable advantages of providing large energy output, receiving energy input from conveniently portable sources, e.g., flasks of high-pressure gases, and being of relatively small overall weight per joule of delivered optical energy. In space use, such lasers encounter the desired total vacuum operating conditions; the earth testing of such lasers, of course, involves the considerable complexity of simulating vacuum operating conditions.

Inevitable imperfections or variations in the high temperature gain medium of such a chemical laser—imperfections resulting from reactant feed non-uniformities and other practical considerations, usually result in optical wavefront phase distortions in the energy delivered from their resonant cavity. These phase distortions can be observed by examination of the optical energy annulus emanating from the periphery of a cylindrical gain generator device. Such energy usually has an azimuthally varying cosine phase distortion pattern wherein the wavefront is found to contain a phase non-uniformity when observed in a circular path around the energy annulus. Periodic cosine and higher frequency cosine Fourier components of phase variation around the annular shape of a chemical laser output beam can be attributed to the presence of essentially discrete reaction chambers around the periphery of a gain generator structure in the usual cylindrical arrangement of a chemical laser.

Correction of this phase distortion can be achieved at least partially by selectively increasing optical attenuation—to provide uniform gain media surrounding the gain generator structure. In view of the limited space, the high gas velocities and large temperature changes involved in such apparatus and the need for the highest possible optical efficiency in a weapon laser device, a more practical arrangement for achieving uniform phase relationship in the laser energy output is found to reside in phase displacement correction of the phase distortions—such as through the use of a phase correction medium dynamically comprised of gaseous or liquid fluids.

In addition to this large chemical laser and weapons application of a phase correction arrangement, there are numerous other optical environments in which phase correction or other spatially patterned refraction needs can be met by the use of fluids disposed according to the arrangements disclosed herein. In small, gaseous, or solid state lasers, as commonly used for laboratory and mechanical purposes, phase distortions or phase aberrations are also found to occur. Similarly, in other non-laser optical apparatus, phase distortions or refraction opportunities not conveniently met by conventional materials are frequently encountered. In the large reflecting mirror art, for example, it is usually difficult and expensive to achieve extreme optical perfection, particularly in environments where practical considerations such as mirror mass and attending material sagging are considered. In each of these situations, the arrangement of the present invention offers an alternative new approach for apparatus improvement and can be attended by the opportunity for significant cost savings when compared with other phase correction arrangements.

Chemical lasers and component parts thereof are known in the patent art as is illustrated by the patents of George L. Clark, U.S. Pat. No. 4,095,193, a broad band gas laser, the patent of John W. Neal, U.S. Pat. No. 3,986,138, a gas dynamic laser nozzle with desirable temperature properties, and the patent of Arthur Dobrzelecki et al, U.S. Pat. No. 3,842,363, a chemical laser nozzle system. None of these prior patents adequately treats the correction of optical wavefront phase distortion in the laser generated optical energy.

SUMMARY OF THE INVENTION

An object of the present invention is to provide optical wavefront phase distortion correction suitable for use in lasers and other optical apparatus.

Another object of the invention is to provide optical wavefront phase aberration correction through the use of suitably arranged fluids disposed in the optical energy path.

Another object of the invention is to provide an optical energy refraction arrangement which can be applied to a variety of optical apparatus.

Another object of the invention is to provide a lightweight, small sized optical energy refraction arrangement.

Another object of the invention is to provide an alternative for the attainment of some high precision dimensions in optical apparatus.

Another object of the invention is to provide a mixed gas refraction and phase compensating arrangement suitable for use in a variety of optical devices.

Additional objects and features of the invention will be understood from the following description and the accompanying drawings.

These and other objects of the invention can be achieved by an optical energy source apparatus for generating a beam of optical energy directed along a first axis path and dispersed laterally across a second axis orthogonal of the first axis, optical wave phase altering means for changing phase relationships in the beam of optical energy, the phase altering means further including a first source of pressurized fluid of first refractive index, a second source of pressurized fluid of lower second refractive index, fluid aperture means located along the path of the beam of optical energy for dispensing a mixed stream of the first and second fluids across the beam, the mixed stream having varying first axis thickness at successive points in the direction of the second axis, means controlling the relative amounts of first and second fluids in the mixed stream for altering the optical refraction capability of the stream.

BRIEF DESCRIPTION OF THE DRAWINGS

FIG. 3 shows apparatus according to the present invention combined with a chemical laser gain generator.

FIG. 4 is an additional partial view of the FIG. 3 gain generator structure.

FIG. 5 shows phase concepts relating to the present invention.

FIG. 6 shows corrected and uncorrected phase relationships in apparatus of the FIG. 3 type.

FIG. 7 is a partial cross-sectional view of the FIG. 3 gain generator with related fluid flow indications.

FIG. 8 shows fluid nozzles usable in the present invention.

DETAILED DESCRIPTION

Figure 1:
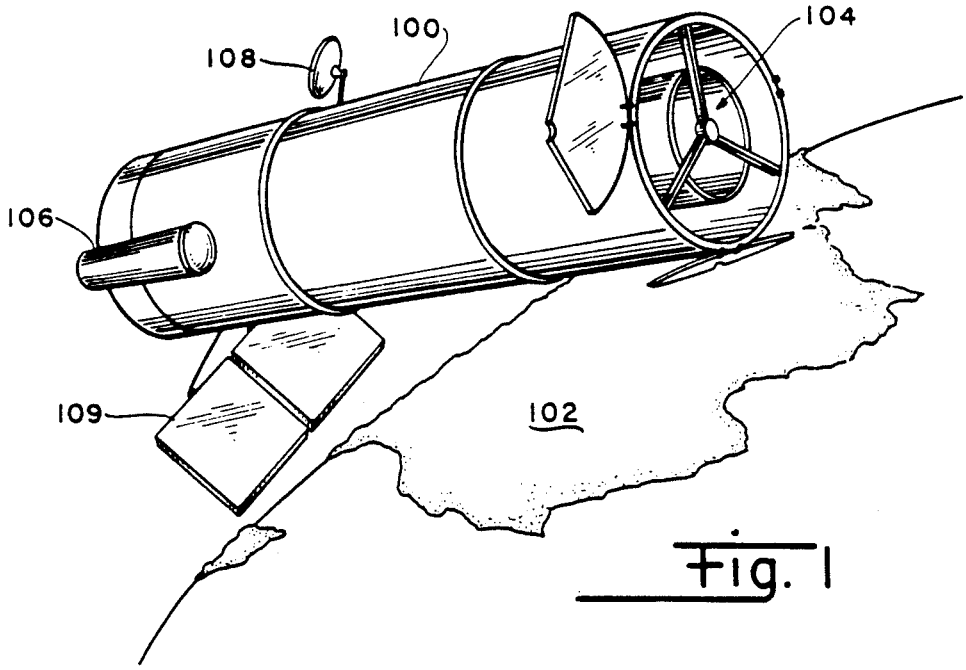
FIG. 1 shows a space environment setting for use of the present invention in a laser weapon device.

FIG. 1 shows an orbit residing space weapon of the type contemplated in the United States Strategic Defense Initiative Program in conjunction with the earth. The weapon 100 in FIG. 1 is of the high energy laser device type contemplated for service in disabling nuclear warheads, satellite vehicles and other missile-launched military hardware located outside of the atmosphere. The weapon 100 in FIG. 1 includes a plurality of maneuvering rockets of the type indicated at 106, solar communications apparatus for information exchange with the earth 102, represented by the antenna 108, and possibly solar energy collecting apparatus such as a solar cell array 109. The output portion of a high-energy laser is indicated at the aperture of the weapon 100 at 104.

The weapon 100 in FIG. 1 is contemplated to be maneuverable in response to earth command and in response to tracking sensor equipment which is not shown in FIG. 1 in order to project a high-energy optical beam on a hostile space object for some practical time duration. As a result of the distances and times encountered in the use of a weapon of the FIG. 1 type, energy level and beam quality needs in the laser 104 are considered demanding of the present state of the optics art. One of the contemplated arrangements for meeting these demands involves the use of a chemical laser wherein gaseous reactants such as nitrogen trifluoride ($NF_3$), ethylene ($C_2H_4$), and duteriom ($D_2$) along with a possible helium ($H_e$) diluent are reacted to obtain an ionized fluorine gain medium. Alternately, carbon dioxide ($CO_2$) or nitrogen ($N_2$) gain media or other chemical reactants known in the laser art are employed.

In order to achieve mode selection in the optically resonant cavity of a chemical laser and additionally in order to pack the laser beam and deliver the maximum energy to a far-field target from a weapon of the FIG. 1 type, it is necessary to consider the phase relationship existing across a beam wavefront within the laser gain medium and in the laser output beam. The variations in gain medium properties experienced in real-life embodiments of a FIG. 1 type laser weapon are generally found to result in optical wavefront phase distortions or aberrations that are undesirable for optimum weapon performance because the beam cannot be focused to a small spot in the far field, i.e., on the target.

Figure 2:
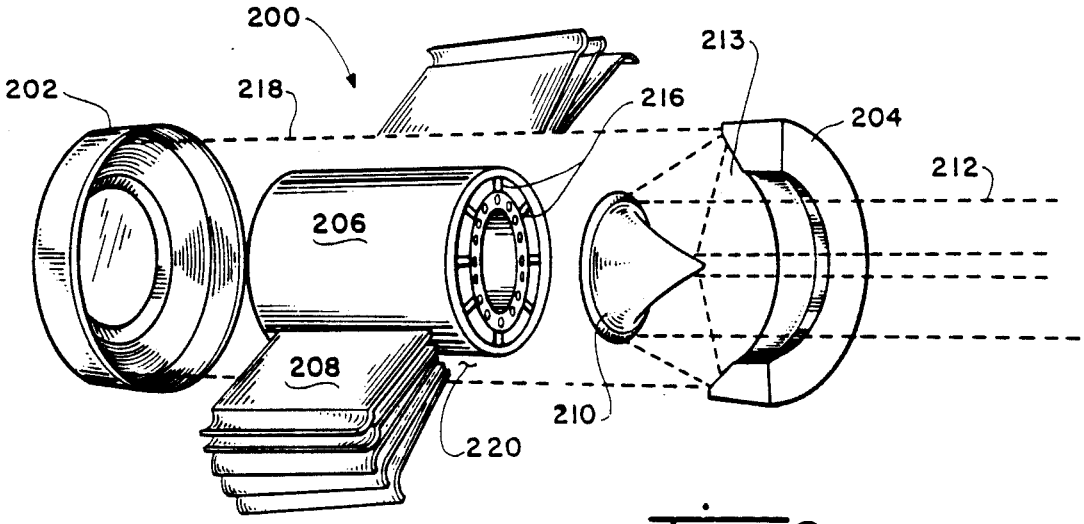
FIG. 2 is a laser optical resonant cavity and gain generator capable of using the present invention.

The major elements of a chemical laser which might be employed in a weapon of the type 100 in FIG. 1 is shown in FIG. 2. The FIG. 2 elements include an optical resonance cavity 200 which includes a pair of optical reflecting members 202 and 204, an optical gain generator 206, and expanded gain medium dispersing apparatus as generally indicated at 208. The optical reflecting members 202 and 204 may be in the form of the partial paraboloid shape shown at 202 in FIG. 2 and the ring parabola and conical axicon shapes shown at 204 and 210. The output beam from the resonant cavity 200 in FIG. 2 is indicated at 212 in FIG. 2. The parallel form of this beam originates with reflections from the conical axicon 210 and pass through the central aperture of the ring parabola 204. Optical energy resident in the output beam 212 can be divided between externally used and returned to cavity portions, i.e., between output and cavity oscillation sustaining portions by such arrangements as an optical scraper assembly located in the path of the beam 212 but not shown in FIG. 2. Such optical scraper assemblies are known to persons skilled in the laser art and may, for example, comprise a first apertured reflecting device disposed at an angle in the beam 212 so that part of the beam energy passes through the aperture to a return to cavity second reflector while the other part is diverted by the first reflecting device as the usable weapon output energy. Other energy dividing arrangements as are known in the laser art may also be used with the present invention apparatus.

The reflecting members 202 and 204 are made to be annular in configuration in response to the annular shape of the gain generator gain medium and are preferably made as near 100 percent optically reflective as possible. Energy reflected from the ring parabola reflector 204 is compacted from its annular shape into the circular output beam 212 by the axicon 210. The reflector 204 and axicon 210 also serve to conduct energy returned from the optical scraper and the return to cavity second reflector elements described above back into the annular gain medium.

Physical support for the exterior portion of the gain generator assembly 206 in FIG. 2 and paths for feeding reactant materials to the gain generator periphery are provided by the divider member network 216; optical energy traversing the path between the reflecting members 202 and 204 is indicated at 218 in FIG. 2. The gain medium providing the reflected energy 218 and the energy 212 resides in the annular cavity 220 surrounding the periphery of the gain generator assembly 206.

As indicated previously, variations in the gain generator medium within the annular cavity 220, particularly variations arising from presence of the network of divider members 216, result in circumferentially or azimuthally patterned phase distortions or phase aberrations in the energy 218. These wavefront phase distortions are preferably corrected within the resonator in order to achieve optimum delivery of the energy 212 to a far-field object.

A weapon of the FIG. 1 type or indeed, most practical embodiments of a FIG. 2 type laser would also involve other optical elements for energy focusing, directing, combining, collecting, sampling, the above described scraping and other optical functions. These other optical elements are omitted in the present description for the sake of simplicity and brevity, but are known in the laser and optical arts. Other arrangements for a chemical laser differing from that shown in FIG. 2 are of course, feasible, and can employ the present invention phase compensation with suitable modification. The chemical laser arrangement shown in the above-referenced patent of G. L. Clark, U.S. Pat. No. 4,095,193, could be adapted for incorporation of the present invention, for example.

The present invention contemplates the introduction of optical path length (OPL) varying media of suitably proportioned dimensions into the path of the resonant cavity energy 218 in FIG. 2 in order that the optical path differences (OPD) introduced by the above-described gain medium variations be compensated. According to the present invention, this optical path length varying medium is in the form of a fluid mass, preferably a moving fluid mass, in the present chemical laser environment. Preferably also, this moving fluid mass is achieved in the form of a controlled dispersion of gases having known optical refraction characteristics across the path of the resonant cavity energy 218 in FIG. 2.

Other locations for the optical path length varying medium including a location in the output beam 212, are of course, feasible within the spirit of the invention. The described location wherein the optical path length varying medium is disposed within the resonant cavity 200 is preferred because of the multiple usage of the medium achieved by reflections between the members 202 and 204, and because phase correction of the resonant cavity medium is conducive to the desired laser operation. In the present invention, furthermore, the use of optical path length varying medium in two locations within the resonant cavity 200, locations at each end of the gain generator assembly 206 is preferred.

FIG. 3 of the drawings shows additional details of an optical gain generator assembly of the type indicated at 206 in FIG. 2 together with some details of an apparatus capable of providing gaseous optical path length varying medium suitable for use with such a gain generator assembly. The gain generator assembly 300 in FIG. 3 is comprised of three modules 302, 304, and 306 which may each be further comprised of a stack of individual reactor elements, one of which is indicated generally at 308 in FIG. 3.

A partial cross-sectional view of a gain generator module stack of reactor elements is shown in FIG. 4 of the drawings, along with two of the baffles 402 and 404 used for feeding reactant materials, e.g., gaseous fluids, into the individual reactor elements. The topmost reactor element is identified with the number 400 in the FIG. 4 view. As may be appreciated by considering the relatively small cross-sectional area of a single reactor element, 400 in FIG. 4 or 308 in FIG. 3, differences in cross-sectional area and therefore reactant pressure occur between the reactor element region immediately adjacent the reactant feeding baffle members 402 and 404 and the reactor element region midway between two baffle members. These area and pressure differences relate to discrete patterns of reactant products or gain medium density variations if the gain medium is examined azimuthally or circumferentially around the reactor elements—examined along the path indicated by the arrow 412, for example.

These gain medium density or homogeneity variations result in differing effective optical path lengths for the optical energy traveling axially along the periphery of the reactor element stack, between the reflectors 202 and 204 of the resonant cavity 200 in FIG. 2, for example, and thereby impart phase distortions or phase aberrations into the optical energy output 212 of the FIG. 2 laser. In summary therefore, the effective optical path length for an optical ray traveling between reflecting members of the resonant cavity along the path 414 in FIG. 4 would differ from the optical path length for a ray traveling along the path 416 because of the differing location of the paths 414 and 416 with respect to the baffle member 402.

For an isentropic media effective optical path length, or more simply, optical path length, may be computed from the relationship:

$$\text{Optical Path Length } (OPL) = K \times [P/T\,(n-1)] \times L$$

where K is the Gladstone Dale coefficient, P is the absolute pressure, T is the absolute temperature, n is the index of refraction of the medium, and L is the physical path length. With respect to the FIG. 3 and FIG. 4 gain generator assembly, it can be appreciated from this equation that variations in the gain medium density which in turn correspond to variations in gain medium pressure and temperature in the equation result in optical path length variations. These variations in turn tend to disrupt the phase homogeneity of a uniformly phased wavefront commencing a traverse of the optical resonant cavity 200 in FIG. 2 between the reflecting members 202 and 204. In simplified form, the distance traveled by a photon of energy between reflecting members of the cavity 200 may be considered to be the product of the physical distance involved and the density of the medium through which the photon travels. In accordance with this simplification, the direct relationship between optical path length and gain medium density is readily apparent and the possibility of correcting for phase aberrations through the use of an auxiliary medium also having physical length and density variations can be appreciated.

In reality therefore, the optical path length differs at each gain generator azimuthal location, e.g., locations such as indicated by the arrows 414 and 416 in FIG. 4, around the periphery of a gain generator assembly of the type indicated at 300 in FIG. 3. In view of the symmetrical relationships usually employed in locating the baffles 402 and 404 around the internal periphery of the gain generator modules in response to physical support and other dictates, periodic variations of optical path length in discrete families or regions around the gain generator assembly periphery occur as indicated at 406, 408 and 410.

Compensation for the optical path length variations occurring in the regions 406, 408 and 410 in FIG. 4 and therefore compensation of the optical wavefront phase distortions occurring when optical energy is transmitted through this varying optical path length can also be accomplished in periodic or regional fashion—by suitable optical path length varying media disposed according to the regions 406, 408 and 410. The compensating medium is therefore disposed periodically around the circumference of the gain generator assembly 300 in FIG. 3. Apparatus for accomplishing this disposal of compensating medium in the regions 406, 408 and 410 of FIG. 4 is also shown in FIG. 3 and comprises the blower assemblies 310 shown at each end of the gain generator assembly 300. These blower assemblies include the gas nozzle area 316, 318, 320, and 322, the serpentine dividers between adjacent nozzle areas and the separator gas nozzle areas 312 and 314.

The concepts underlying the FIG. 3 blower assemblies 310 may be appreciated from the diagrammatic representations of major blower assembly elements and path length shown in FIG. 5 of the drawings. The top part of FIG. 5, FIG. 5A, represents a cut-out, flattened and shortened portion of the gain generator assembly 300. The bottom portion of FIG. 5, FIG. 5B, includes a graphic representation of the departure from a nominal path length occurring around, for example, the baffles 402 and 404 in FIG. 4. In FIG. 5 then, the optical path most closely associated with baffles of the 402 and 404 type is identified as the baffle flow areas BF, 516 and 520 in FIG. 5. Similarly, the optical path intermediate the baffle flow areas is identified with the MF, (midspan flow), at 518.

The maximum departure of the optical path length from a nominal value existing at the baffle gas flow area 516 and 520 in FIG. 5 is observed to occur as expected, midway between baffles at the MF area 518 as is indicated by the optical path difference curve 526 in the FIG. 5B lower part of FIG. 5. The optical path correction to be provided by the blower assemblies 310 in FIG. 3 is therefore indicated at 528 in FIG. 5B. Angular values of azimuth between the identified flows of FIG. 5 are shown along the axis 530 in FIG. 5. The two baffle flows are separated by 360/6 or 60 degrees in FIG. 5, and the midspan flow area 518 is shown to fall midway between these baffle flows or at an angular location of 30 degrees. The FIG. 5 drawings are, of course, rotated 90 degrees with respect to the similar components shown in FIG. 3 and FIG. 4 of the drawings.

An aspect of the present invention which can be appreciated from the FIG. 3, FIG. 4, and FIG. 5 drawings and the above discussion is that the optical wavefront phase distortions introduced by the differing optical path length at different azimuthal positions around the circular and gain generator assembly 300 are to be compensated by the introduction of an optically refracting gas flow directed in a substantially radial direction of the gain generator elements 308 and 400, and originating in the blower assemblies 310 in FIG. 3. In view of the cyclical and constantly changing effective optical path lengths at different azimuthal locations around the gain generator periphery, the cross-sectional thickness of the introduced correcting gas flow is herein also made to have varying thickness, the compensating gas flow thickness and the gain generator path length differences are therefore in essence complementary to each other, but need not necessarily be physical extent complementary flows.

The gas selected for use as the optical path length varying medium, that is, the gas introduced by the blower assemblies 310 in FIG. 3 should most conveniently have differing optical refraction properties in comparison with the gas of the gain generator medium in order that smaller cross-sectional compensating flows obtain and of course, in order to avoid the inconvenience of dealing with additional quantities of the highly reactive gain generator medium gases. Preferably, the optical path length varying medium introduced by the blowers 310 is a heavy, high density fluid such as one of the Freon ® gases manufactured by E.I. DuPont deNemours and Co. of Wilmington, Del. and others. The Freon ® gas having the chemical formula $CF_4$ is preferred for this purpose. Other gases including nitrogen and argon could, of course, be employed for the optical path length varying medium with blower dimensional changes and other modifications. Preferably, the employed refracted gas should be chemically inert and chemically stable at the high temperatures and low atmospheric pressures employed in a chemical laser apparatus.

The gas nozzle areas used for introducing the high-density optical path length varying gas such as Freon ® are shown at 320, 322, 506, and 507 in FIGS. 3 and 5 of the drawings. As suggested by the patterns appearing in these portions of FIG. 3 and FIG. 5, the nozzle areas preferably include gas diffusing members such as sintered metal plates or perforated plates made with numerous small drilled holes in order that uniform gas flow be achieved and in order that relatively large pressure drops can be employed between the interior and exterior surfaces of the nozzle areas in support of this uniform gas flow. Sintered metals, such as a Monel ® and nickel, structure have been found desirable for use as the nozzle area diffusion cover plates. The cross-sectional appearance of the nozzle area diffusion cover plates is indicated at 820 in FIG. 8 of the drawings.

In view of the moving nature of the gases comprising the gain medium of the gain generator assembly 300 in FIG. 3 and the velocities contemplated for the optical path length varying medium issuing from the nozzle areas 318, 320, 506, and 507, it is desirable to provide buffering or isolating gas streams adjacent the optical path lengths varying gas medium in order to minimize shear effects between adjacent gas streams and the intermixing of the differing gases in the gain medium and the optical path length varying medium. Low density, lightweight gases such as helium are desirable for use in the buffering or isolating gas streams. In-board located nozzle areas for issuing these buffering or isolating gas streams are shown at 312, 314, 316, 512, and 513 in FIGS. 3 and 5 of the drawings. The buffering gas nozzle areas 312, 314, 512, and 513 may be incorporated as a part of the gain generator structure used to accommodate thermal expansion. In this regard, each of the gain generator component modules 302, 304 and 306 in FIG. 3 is subject to dimensional change in the pressure of operating temperature changes. The expansion members 301 and 303 accommodate these thermal expansion changes as also do the separator gas nozzle areas 312 and 314 located at each end of the gain generator assembly. Preferably, the buffering gas issuing from the nozzle areas 312, 314, 512, and 513 in FIG. 5 is imparted with the same radial direction and similar radial velocity as the medium gases resulting from the reaction at gain generator reactor element surfaces—in order that shear action and gas intermixing are minimized. Supersonic gas velocities are appropriate for the gases issuing from these buffer gas nozzle areas.

The buffering or isolating gas nozzle concept is also desirably used on the outboard or exterior sides of the optical path length varying nozzle areas 506 and 507; the nozzle areas 316, 318, 508, and 509 in FIGS. 3 and 5 are employed for this purpose and are shown to be complementary in dimension to the optical path length varying media gas nozzle areas in FIGS. 3 and 5. This complementary relationship is convenient for providing flat planar surfaces at the ends of the gain generator assembly but is not otherwise necessary for functioning of the invention. The radially directed movement of the gases issuing from these complementary or outboard nozzle areas is preferably made similar to that of the gases located in the areas immediately outside the gain generator assembly, subsonic gas velocities being contemplated for these outboard buffering gas streams. Light gases as indicated above, are preferred for use in the nozzle areas 508 and 509.

The lower density and resulting small amount of optical refraction incurred by optical energy photons traversing the buffering or isolating gas streams could be, but in fact have not been neglected in the optical characteristics of the present invention apparatus. Gases other than the peferred helium, if used for the buffering and isolating gas streams, may of course, have such influence on the resonant cavity characteristics as to require consideration—and are therefore provided for in the equations below.

As indicated by the different cross-hatching or patterns between the nozzle areas 506 and 508, the diffusion cover plates for these two areas can be made to accommodate the differing gas densities and differing gas amounts needed in the optical path length varying media and the outboard buffering or isolating gas streams. A serpentine shaped divider is aIso disposed between the two dlffering gas areas of the outboard blower assembly; this serpentine shaped divider is identified with the numbers 324 and 326 in FIG. 3, and by the numbers 510 and 511 in the FIG. 5 diagram. As described later herein in connection with FIG. 8, the serpentine dividers 324 and 326 actually are disposed below the diffusion cover plates in a position that would make the serpentine divider invisible in fuly assembled and formal versions of FIGS. 3 and 5. For the present purposes therefore FIG. 3 may be considered a view of the gain generator with the diffusion cover plate removed and FIG. 5 an informal or diagrammatic view showing element relationships.

The shape of the serpentine divider element is of course, determinative of the cross-sectional area of the optical path length varying gas media and therefore a matter deserving careful attention in embodying the invention. For the described gain generator arrangement having six baffle members of the type shown at 402 and 404 in FIG. 4 and therefore having six fundamental Fourier frequency components in the azimuthally considered gain media cavity and also having significant second-order Fourier path length components, the needed path length corrections and serpentine divider shapes are characterized by the equation:

$$(OPD)_{BB}=2Z(\phi)(G_2-G_1)X_2\rho$$

where $Z(\phi)$ is the thickness of the dual-gas flow in the optical axis direction and varies with azimuth angle $\phi$; $G_1$ and $G_2$ are, respectively, the Gladstone-Dale coefficients of the heavy Freon® ($CF_4$) and light (He) components of the flow, $X_2$ is the mole fraction of the heavy component, and $\rho$ is the molal gas density (mol/cc is conventionally implied by Gladstone-Dale coefficients). The equation gives the OPD increment for a thickness $2Z(\phi)$ (two bank blowers) on replacing component 1 with 2 to the extent of the mole fraction $X_2$.

The shape of the optical path length varying medium area, the nozzle areas 506 and 507 in FIG. 5, is characterized by the equation $$(Z\phi)\ (\text{in.})=0.208+0.250\cos 6\phi+0.042\cos 12\phi$$

assuming a zero degree azimuth angle reference at one of the baffles. As illustrated by this relationship, the optical path length varying medium may have a thickness of 0.5 inch maximum in baffle areas 516 and 520 in FIG. 5, and a minimum thickness at midspan flow areas, 518 in FIG. 5, of substantially zero. The $12\phi$ component in this relationship enhances the rate of thinning and going from baffle to midspan areas and complies with the concept of the gain generator optical path difference being relatively flat through midspan and quarter-span areas. This arrangement of the optical path length varying medium relates to calculated estimates of optical path difference of $0.074\lambda$ from baffle to midspan at a reference wavelength $\lambda$ of 3.8 microns, tunnel pressures of 35 torr and use of nitrogen as the heavy gas component with a $G_2-G_1$ value of 5.9 cc per mole. At near ambient stream temperatures, 100% nltrogen is, however, barely capable of providing the required correction and a preference for Freon® as a path length varying medium is justified.

The total amplitude of optical path length correction provided by the blower assembly 310 in FIG. 3 is, according to the above equations, controllable by the factors $G_2-G_1$, gas composition ($X_2$), and gas density ($\rho$). A convenient means for controlling this overall correction amplitude is found to reside in mixing the high-density optical path length correcting gas medium with a lower density gas such as helium, and using the mixed gases or dual gases, as the optical path length varying medium issued from the nozzle areas 320, 322, 506, and 507. By means of this mixed gas arrangement, fine adjustments of the optical correction may be achieved and such refinements as closed loop regulation of the achieved optical phase correction can also be arranged.

Molal density of the optical path length varying medium is also determined by pressure and temperature in accordance with the mathematical relationship that Density=P/RT, which is well-known in the gas art. Temperatures depends principally on feed system design and operation and pressure is the tunnel pressure within the gain generator optical cavity and is a complex result of cavity condition, including the flow of tunnel purge gases and design of the blower 310. Therefore the Freon® flow rate is not directly influential on the optical path difference achieved in the invention and gas presence without necessarily having gas flow are optically satisfactory. Gas flow rate for the correcting medium must, however, provide sufficient velocity for good free stream definition and may have an indirect effect through the avenue of tunnel pressure.

For the described optical path length varying arrangement, the optical path correction achieved varies not only with azimuth, but also with radius in the optical cavity aperture. As an approximation, the optical path difference of the gain generator flow is inversely proportional to radius. Since the inner and outer radii of a gain generator cavity may be in the order of 25 and 30 cm, the radial optical path difference variation of a gain generator assembly in such a cavity is about 20%, a significant but not major factor. In the described resonant cavity and optical path length varying blower arrangement, the radial decrease of blower optical path difference is estimated to be of the same order, i.e., approximately 20%, as the radial decrease of the gain generator structure itself.

In a gain generator assembly of the indicated 3.8 micron wavelength, the thickness (length) of the mixed gas region can be determined from the above equation and the known laser cavity conditions of required correction, composition, pressure and temperature. For the indicated conditions, a mixed gas length of 0.5 inch is all that is required. In the described arrangement of the invention, the overall blower assemblies at each end of the gain generator may occupy an axial space in the order of 2.5 cm or 1 inch each.

Other details included in the FIG. 5 drawings include the gain generator body portion 514, the optical path difference function 528 and the azimuth indicating axis 530 which includes the zero degree, thirty degree, and sixty degree azimuth indications relevant to a six-baffle gain generator arrangement.

Additional details of the optical path length varying gas medium flow and the source nozzle structures for this flow are shown in FIGS. 7 and 8 of the drawings. In FIG. 7, for example, a cross-sectional view of the upper right hand portion 328 of the gain generator assembly 300 in FIG. 3 is shown together with typical gas flow trajectories during operation of the gain generator and the optical path length correcting blowers. The FIG. 7 view represents a cross-section of a FIG. 3 type gain generator assembly taken at about one-fourth of the azimuthal distance between adjacent baffles, a point wherein the serpentine divider cross-section element 702 is located midway between two equally sized heavy gas and isolating gas issuing chambers 712 and 714. In the FIG. 7 view, the gain generator body and the gain media are located to the left, as indicated by the arrow 730. The member 726 in FIG. 7 represents a cantilever portion of the gain generator mounting structure, the member 716, a portion of an end diffuser used with the gain generator, and the curving blades 710 and 711 a portion of the isolating gas issuing and expansion accommodating gain generator end plate.

The principal gas flow paths are shown at 704, 706, and 708 in FIG. 7, and comprise respectively, the exterior-most isolating gas flow, the optical path length correcting heavy gas flow, and the innermost isolating gas flow. FIG. 7 additionally shows the path of gases drawn into the exhaust flow path 718 through the apertures 728 from the environment external of the gain generator. Flow paths for the drawn-in components are indicated at 720, 722, and 724 in FIG. 7, and represent stream components around the end diffuser 716, a mid-aperture stream component 722 and stream component around the gain generator mounting structure member 726, respectively. Actuation means not shown in FIG. 7 may of course, be employed to induce or supplement the confined flow departing from the FIG. 7 structure through the flow path 718. The blower assembly which includes the gas issuing chambers 712 and 714 is indicated at 700 in FIG. 7, while the sintered metal nozzle plate is indicated at 730.

As indicated by the outline of the flow paths 704, 706, and 708 in FIG. 7, some distortion of flow paths occurs as the moving gas streams become distal of the gain generator structure. These distortions are expected in operation of the FIG. 7 apparatus and are acceptable, since principal optical interest in the gas streams resides in the region adjacent the gain generator, that is, the lower portions of the FIG. 7 stream paths. As indicated previously herein, generally it is desirable to select the velocities of the isolating gas stream components in response to a minimum mixing condition for the gases; generally this results in the innermost isolating gas stream 708 having a radially directed velocity near that of the gain medium gases, while the outermost isolating gas stream 704 more nearly approximates conditions in the aperture 728 and the region exterior of the aperture 728. The innermost isolating gas stream 708 therefore fills the space between the gain medium and the heavy gas stream 706 made necessary by thermal expansion accommodation in the gain generator. That is, the realities of thermal expansion accommodation in the gain generator require the presence of some varying space along the axial length of the gain generator and the absence of intentional gas flow in this varying space is desirably avoided. The flow 708 serves therefore as both a void filling and an interface between gain generator medium and optical path length correcting medium. The gap between the curving blades 710 and 711 varies in size according to temperatures achieved in the gain generator structure and provides a corresponding variation in the axial thickness of the gas stream 708. Since the gas used in the stream 708 is of a lightweight, low optical refraction characteristic, this blade spacing and gas stream thickness variation is of little optical significance.

The chambers 712 and 714 in the FIG. 7 view of the gas blower assembly 700 are general representations of the elements preferred for use in embodying the invention as also are the representations of FIGS. 3 and 5. Additional details of the actual preferred structure of the blower elements are shown in the cross-sectional views of FIG. 8 of the drawings. A pair of subsonic mixed gas and exterior-most isolating gas issuing nozzles suitable for use with subsonic gas flows are shown at 800 in FIG. 8 and a pair of supersonic nozzles are shown at 802. The two subsonic gas nozzles 804 and 806 in FIG. 8 represent cross-sections taken at separated azimuthal locations along the periphery of a phase correcting gas blower assembly—in locations where the divider members 814, corresponding to the serpentine divider 324 in FIG. 4 and the divider 702 in FIG. 7, are located in different positions. The nozzle 804 is taken from the mid-span or thirty degree locus of a phase correcting blower assembly, as is evidenced by the large cavity 818 for buffering gas or helium issuance and the small cavity 816 for heavy gas or Freon® issuance. The sizes of these cavities is reversed in the nozzle 806, which is taken near a gain generator baffle location.

The body 824 of the FIG. 8 nozzles may be arranged as a part of the gain generator mounting structure 726 or otherwise disposed. The fluid entry ports 812 and 822 in FIG. 8 may be coincident with differing ones of the baffle members 402 and 404 in FIG. 4 or with other suitable conduits in order to supply the issuing gases to the cavities 816 and 818. The diffusion cover plate 820 in FIG. 8 may be of the sintered metal construction indicated previously. Nozzle cross-sections of the type shown at 804 and 806 in FIG. 8 provide desirable gas flows and preferably maintain the significant issued gas pressure difference between nozzle interior and exterior regions that was described above. For the nozzles shown at 804 and 806, these flows prevail at velocities which are generally in the subsonic range. Where gas velocities in the supersonic range are required, modified nozzles as shown at 808 and 810 in FIG. 8 are preferable.

In the supersonic nozzle arrangements 808 and 810, a nozzle intended for between-baffle disposal is represented at 808 and a nozzle intended for baffle-adjacent disposal is represented at 810. The serpentine divider is in the form shown at 826 in these supersonic nozzles and changes somewhat in cross-sectional configuration with the azimuthal position under consideration. The supersonic nozzles preferably have shaped throat areas of cross-sectional configuration such as is shown at 828 and 830 in FIG. 8. These throat areas are of a curving restricted aperture configuration in accord with the principles of supesonic gas flow which are known in the art. Similar elements in the nozzle portions 804, 806, and 808, 810 are identified with the same numbers in FIG. 8, including the fluid entry ports 812 and 822, and the body portion 824. A diffusion coverplate member 820 is not required in the supersonic nozzles 808 and 810 because flow distribution is controlled by the sonic throat structure.

Returning now to FIG. 6 in the drawings there is indicated the uncorrected, partially corrected, and more fully corrected optical path difference descriptive of the function of the fluid correcting apparatus. FIG. 6 shows therefore the phase relationships expected in a gain generator assembly under different conditions of phase correction. Optical path phase differences in fractions of a wavelength are shown along the vertical axis in FIG. 6 while gain generator azimuth positions are shown along the horizontal axis 604. On the azimuth position axis 604 the point 608 relates to a mid-span point halfway betweem two baffle positions, and the points 610 and 614 represent quarter-span locations halfway between the baffle and mid-span azimuth positions. The partially corrected optical path difference curve 618 in FIG. 6 indicates the degree of correction expected from the addition of a 50% Freon® and 50% helium gas mixture into a phase correcting nozzle array shaped according to a first order cosine Fourier component correction, but does not include higher order Fourier components, i.e., components of greater angular frequency. The more fully corrected optical path difference curve, 620 in FIG. 6, represents correction including second-order Fourier components or components having a frequency of twice the number of baffle members and the Freon® to helium mix required to fully correct the 6$\phi$ or six baffle fundamental component. The absence of perfect correction or zero optical path difference in the FIG. 6 description indicates the need for additional higher-order Fourier components in the axial thickness of the correcting gas dispensing nozzles for the attainment of maximum phase correction. Clearly, higher frequency Fourier components up to any desired frequency can be included in an embodiment of the invention with the required fine detail changes in nozzle area and the structural changes needed to retain such fine detail dimensions in the presence of thermal expansion and other operating variations. For laser weapon use, however, phase correction to the degree indicated in the curve 620 in FIG. 6 is generally satisfactory.

The present description therefore discloses a phase correcting arrangement which can be used in a space vehicle mounted weapon laser system. Although the chemical laser described herein provides a desirable environment for use of the invention, other forms of lasers are within contemplation of the invention. Chemical lasers moreover can assume many different configurations other than the round, cylindrical shaped structure disclosed herein. The phase correcting arrangement is not, however, limited to use in the weapon or even the laser art, but may be employed in a variety of optical systems such as large lens and mirror systems or wherever optical phase change or optical path length modification is needed. In addition, the optical phase correction arrangement has been described in terms of corection achieved with a gaseous fluid; indeed, gaseous fluids offer a most desirable and practical medium for use in the invention, however, other fluids, including liquids, may also be employed in embodying the invention.

Phase correction in the temporal or time domain may also be achieved with the present invention through variation of nozzle shape and cross-section areas, and to some degree, through variations of correcting media pressure in the time domain. Varying nozzle areas can, of course, be achieved with rotating nozzle components, axial movement of nozzle components, and other cross-sectional area varying techniques which are known in the transducer and mechanical arts. Time domain variation of the optical path correction could, of course, allow dynamic corrections for conditions internal or external of a laser device, particularly where a feedback signal descriptive of the received laser image can be arranged.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. A method for correcting phase aberrations across the spatial distribution of a stimulated emission optical energy beam comprising the steps of:

transmitting said energy beam through a flow of mixed high optical refraction first gas and lower optical refraction second gas, having spatially distributed regions of differing thickness each proportional to the amount of phase correction needed at the corresponding spatial regions of a cross-section of said energy beam; and selecting the amount of said first gas and the amount of said second gas in said flow of mixed gases in response to the amount of phase correction needed in a predetermined portion of said beam cross-section.

2. The method of claim 1 wherein said predetermined beam cross-section portion is a portion of maximum phase aberration.

3. The method of claim 1 wherein said flow of mixed gases is located intermediate the optically reflective portions of an optical resonance cavity.

4. The method of claim 1 further including the step of passing said optical energy beam through a second flow of said first and second gases and wherein said first and second flows are each located intermediate the optical reflection members of an optical resonance cavity.

5. The method of claim 1 wherein said flow of mixed gases has a flow velocity in the supersonic velocity range.

6. The method of claim 1 wherein said flow of mixed gases has a flow velocity in the subsonic velocity range.

7. The method of claim 1 further including the step of buffering said flow of mixed gases from intermixture with adjacent environment gases with a stream of isolating gas directed substantially parallel with the flow direction of said mixed gas flow.

8. The method of claim 7 wherein said stream of isolating gas is also comprised of one of said first and second gases.

9. The method of claim 8 wherein said mixed gases are taken from the group of helium, nitrogen, argon and Freon®.

10. The method of claim 7 wherein said mixed gases are helium and $CF_4$ Freon® and said isolating gas is also helium.

11. A method for compensating optical energy wavefront phase displacements in a laser beam comprising the steps of:

issuing a mixed stream of long optical path length producing and shorter optical path length producing gases across the path of said laser beam;

shaping the issued gas stream thickness in a pattern responsive to the phase correction needed in respective areas of the intercepted laser beam; and proportioning the long path length producing gas and short path length producing gas ratio in said stream of gases in proportion to the phase correction needed in a maximum phase error portion of said beam cross-section.

12. The method of claim 11 wherein said long path length producing gas and said short path length producing gas differ in one of the properties of pressure, temperature, and composition.

13. The method of claim 12 wherein said long path length producing and short path length producing gases differ in optical refraction coefficient.

14. The method of claim 13 wherein said gases differ in composition.

15. The method of claim 14 wherein said gases include helium, nitrogen, and Freon®.

16. The method of claim 11 further including the step of isolating said stream of mixed gases from a gaseous gain media region of said laser with a flowing stream of buffer gas.

17. The method of claim 12 further including the step of matching the flow velocity of said buffer gas with the flow velocity of said issued gas stream in accordance with predetermined criteria.

18. Laser apparatus comprising:

first and second optical resonator reflective members disposed in mutual reflection alignment along a linear boresight axis, said second reflective member providing partially reflecting and beam emitting partially transmitting optical characteristics;

optical gain generator means located along said boresight axis intermediate said first and second reflective members for supplying coherent optical energy to the optical path traversing said reflecting members and the optical path emerging from said second reflecting member along said boresight axis; and gaseous refraction optical phase altering means located in one of said optical paths for modifying the relative phase relationship across light wavefronts transmitted along said boresight axis.

19. The apparatus of claim 18 wherein said phase altering means is located along said boresight axis intermediate said reflective members within said optical resonator.

20. The apparatus of claim 19 further including a second of said gaseous refraction optical phase altering means, said two phase altering means being located at opposing ends of said optical gain generator means along said boresight axis.

21. The apparatus of claim 20 wherein said gaseous refraction phase altering means includes means for generating a gas flow stream having predetermined point-to-point variations in at least one of the characteristics of pressure, temperature, composition and cross-sectional area.

22. The apparatus of claim 21 wherein said phase altering means includes nozzle means for generating a gas flow stream having point-to-point variations in cross-sectional area.

23. The apparatus of claim 22 wherein said phase altering means also includes means for supplying gases of differing composition to said nozzle means.

24. The apparatus of claim 23 wherein said gases of differing composition also have differences indices of optical refraction.

25. The apparatus of claim 24 wherein said gases are comprised of helium and Freon®.

26. The apparatus of claim 22 wherein said nozzle means includes a plurality of nozzles disposed randomly within a region of varying predetermined shape and area.

27. The apparatus of claim 26 wherein said nozzle means includes a gas transmitting porous member comprised of sintered metal.

28. The apparatus of claim 24 wherein said apparatus includes means for imparting a flow velocity in the subsonic range to said gases.

29. The apparatus of claim 24 wherein said apparatus includes means for imparting a flow velocity in the supersonic range to said gases.

30. The apparatus of claim 22 wherein said optical gain generator means includes a gaseous optical gain generating medium.

31. The apparatus of claim 30 wherein said phase altering means includes a plurality of nozzles disposed in accordance with a predetermined arrangement and segregated from said gaseous optical gain generating medium by an array of buffer gas dispensing nozzles.

32. The apparatus of claim 22 wherein said nozzle means includes a plurality of nozzles of controllable cross-section overall aperture.

33. The apparatus of claim 18 wherein said second reflective member comprises a ring parabola disposed around said boresight axis and having an open central portion for optical energy emergence from said optical resonator.

34. Optical apparatus comprising:

optical energy source means for generating a beam of optical energy directed along a first axis path and dispersed laterally across a second axis orthogonal of said first axis;

optical wave phase altering means for changing phase relationships in said beam of optical energy, said phase altering means further including:

a first source of pressurized fluid of first refractive index;

a second source of pressurized fluid of lower second refractive index;

fluid aperture means located along the path of said beam of optical energy for dispensing a mixed stream of said first and second fluids across said beam, said mixed stream having varying first axis thickness at successive points in the direction of said second axis; and means controlling the relative amounts of said first and second fluids in said mixed stream for altering the optical refraction capability of said stream.

35. The apparatus of claim 34 wherein said varying thickness is disposed in predetermined response to phase relationships along light wavefronts originating in said optical energy source.

36. The apparatus of claim 35 wherein said frist and second fluids comprise gases of differing optical refraction character.

37. Chemical laser space weapon apparatus comprising:

a space vehicle;

an elongated optical resonance cavity mounted in said space vehicle and including an optical reflecting member located adjacent a first end thereof and an optical reflecting and transmitting member located adjacent the second beam output end thereof;

an elongated stimulated emission optical gain generator energy source member of the peripheral combustion surface, chemical reactant type located within said optical resonance cavity and surrounded therein by a reaction region having optical alignment with said resonance cavity;

a pair of gaseous refraction phase correction members located at opposite ends of said gain generator member and having refraction gas emitting nozzles directed radially of said peripheral combustion surface, across said gain generator reaction region;

said phase correction members refraction gas emitting nozzles including a first series of nozzles of cyclically varying cross-sectional area disposed adjacent said gain generator peripheral combustion surface and second and third series nozzles of constant cross-section located on either axially adjacent side of said varying cross sectional area nozzles;

means for supplying a pressurized flow of low optical refraction index buffer gas to said second and third series nozzles; and means for supplying a controllable mixture of high optical refraction index and low optical refraction index gases to said first nozzles.

38. The apparatus of claim 37 wherein said gain generator energy source member includes means for generating a principal energy output of said weapon apparatus within the infrared spectral region.

39. The apparatus of claim 38 wherein said optical resonance cavity and said gain generator energy source member are each cylindrical in shape, said gain generator energy source member residing concentrically within said cavity and wherein said optical reflecting member and said optical reflecting and transmitting members reside at opposite ends of said resonance cavity with said reflecting and transmitting member including a hollow centered ring parabola and an optical scraper.

40. The apparatus of claim 38 wherein said high optical refraction index gas is a gas in the group of nitrogen, argon, and $CF_4$ Freon ®.

41. The apparatus of claim 40 wherein said low optical refraction index gas is helium.

42. The apparatus of claim 39 wherein said gain generator energy source is connected with sources of nitrogen trifluoride and ethylene reactants.

43. The apparatus of claim 42 wherein said gain generator energy source is also connected with sources of deuterium and helium gases.

* * * * *